United States Patent [19]
Chapman et al.

[11] Patent Number: 5,495,813
[45] Date of Patent: Mar. 5, 1996

[54] COMBUSTION METHOD AND APPARATUS

[75] Inventors: Robert D. Chapman, Dacre Harrogate; Paul A. Gredley, Ravenshead, both of United Kingdom

[73] Assignee: The BOC Group pcl, Windlesham, England

[21] Appl. No.: 402,755

[22] Filed: Mar. 10, 1995

Related U.S. Application Data

[63] Continuation of Ser. No. 154,229, Nov. 18, 1993, abandoned.

[30] Foreign Application Priority Data

Nov. 18, 1993 [GB] United Kingdom .................... 9224211

[51] Int. Cl.⁶ ........................................................ F23B 7/00
[52] U.S. Cl. ........................... 110/341; 110/346; 110/214; 110/243; 110/248
[58] Field of Search ............................ 110/210–214, 243, 110/248, 341, 346

[56] References Cited

U.S. PATENT DOCUMENTS

| | | | |
|---|---|---|---|
| 3,780,674 | 12/1973 | Liu | 110/248 |
| 3,962,867 | 6/1976 | Ikeura et al. | 60/276 |
| 4,023,508 | 5/1977 | Cantrell, Jr. et al. | 110/243 |
| 4,279,208 | 7/1981 | Guillaume | 110/346 |
| 4,280,417 | 7/1981 | Alexandersson | 110/248 |
| 4,625,661 | 12/1986 | Melchior | 110/237 |
| 4,861,262 | 8/1989 | Gitman et al. | 110/214 |
| 4,870,910 | 10/1989 | Wright et al. | 110/190 |
| 4,969,405 | 11/1990 | Goodrich | 110/248 |
| 5,242,295 | 9/1993 | Ho | 110/214 |

FOREIGN PATENT DOCUMENTS

| | | |
|---|---|---|
| 114587 | 5/1983 | European Pat. Off. . |
| 0499184 | 8/1990 | European Pat. Off. . |
| 3537945 | 4/1997 | Germany . |
| 1459159 | 1/1975 | United Kingdom . |
| 1542658 | 5/1976 | United Kingdom . |
| 1552303 | 4/1977 | United Kingdom . |
| 1586174 | 7/1977 | United Kingdom . |

*Primary Examiner*—Andrew M. Dolinar
*Attorney, Agent, or Firm*—R. Hain Swope; Larry R. Cassett

[57] ABSTRACT

Apparatus and method for incinerating waste whose ease of burning may vary form batch to batch, wherein burning is conducted in a main combustion region to form combustion products containing combustibles and in a secondary combustion zone which is supplied with oxygen at a rate during a first period of time which is independent of the composition of the combustion products or resulting flue gas and at a rate during a second period of time which is determined as a function of the concentration of at least one component of the combustion products or flue gas.

6 Claims, 2 Drawing Sheets

COMBUSTION METHOD AND APPARATUS

This is a continuation of application Ser. No. 08/154,229 filed Nov. 18, 1993, now abandoned.

TECHNICAL FIELD

The present invention relates to a method and apparatus for the combustion of waste material. More particularly, the present invention is concerned with the batch-wise incineration of waste material, such as hospital waste, whose calorific value may vary randomly from batch to batch.

BACKGROUND OF THE PRIOR ART

U.S. Pat. No. 4,976,207 discloses apparatus for carrying out a combustion process including a combustion chamber and a secondary or post-combustion chamber. Air is injected into the post-combustion chamber. If desired, the air may be preheated. Sensors are provided within the combustion chamber, the post-combustion chamber and an air supply conduit so as to control operation of a device for preheating the air in response to detected sensed signals from the sensors.

U.S. Pat. No. 4,279,208 relates to method and apparatus for the treatment of industrial wastes. At least some of the constituent materials of the waste are subjected to combustion or pyrolysis to produce flue gases. The supply of an oxygenated combustion-supporting gas to the waste is regulated as a function of at least one predetermined characteristic of the flue gas. For example, the oxygenated gas may be a mixture of air and substantially pure oxygen, and the feed rate of one or both of these gases may be regulated in response to either the sensed temperature or the oxygen content of the flue gases.

The control systems disclosed in U.S. Pat. Nos. 4,976,207 and 4,279,208 are essentially reactive in nature. They suffer from the disadvantage that if the waste material has a randomly varying calorific value, occasions can arise when there is a temporary deficiency of oxygen in the secondary combustion region. As a result the flue gases can contain, for a period of time, an unacceptably high concentration of carbon monoxide or residual particles of carbonaceous material. Moreover, by the time the reactive control system has adjusted the oxygen concentration (in the case of the apparatus disclosed in U.S. Pat. No. 4,279,208) or the temperature of the air (in the case of the apparatus shown in U.S. Pat. No. 4,976,207) the demand for oxygen may have subsided. As a result, such control systems may be wasteful and yet fail to produce an adequate quality flue gas.

SUMMARY OF THE INVENTION

According to the present invention there is provided a method for incinerating waste material comprising feeding to a main combustion region batches of combustible waste material whose ease of burning may vary randomly from batch to batch, burning said batches of waste material in said main combustion region and thereby forming combustion products containing combustibles, burning said combustibles in a secondary combustion region and supplying oxygen to support the combustion of said combustibles, and discharging flue gas from said secondary combustion region, wherein in a first set of periods of time the oxygen supply rate is determined independently of the composition of the combustion products or the flue gas, and in a second set of periods of time, wherein each period of time of the second set alternates with each period of time of the first set, the oxygen supply rate is determined as a function of the monitored concentration of at least one component of the combustion products or flue gas.

The invention also provides apparatus for incinerating waste material comprising means for the batch-wise feeding to a main combustion region of combustible waste material whose ease of burning may vary randomly from batch to batch, at least one burner for burning said batches of waste material in a main combustion region and thereby forming gaseous combustion products containing combustibles, means defining a secondary combustion region for burning combustibles in said combustion products, oxygen supply means for supplying oxygen to said secondary combustion region to support combustion therein, an outlet from the secondary combustion region for discharging flue gas from the apparatus, and control means for controlling the supply of oxygen to the secondary combustion region such that in a first set of periods of time the oxygen supply rate is determined independently of the composition of the combustion products or the flue gas, and in a second set of periods of time wherein each period of time of the second set alternates with each period of time of the first set, the rate of supplying oxygen is determined as a function of the monitored concentration of at least one component of the combustion products or the flue gas.

The batches of waste material are typically fed to the incineration apparatus according to the invention at regular intervals. For most of the duration of each period of time between successive batches being fed to the furnace, the supply of oxygen to the secondary combustion region is preferably determined by monitoring the concentration of at least one component of the flue gases or combustion products, but at the end of each period, and if desired at the start of the next period, the rate of supply of oxygen is preferably determined independently of the composition of the flue gases or combustion products. Such independent supply of oxygen enables the oxygen concentration in the secondary combustion region to be set so as to adequately cope with the combustion products that are likely to be encountered from even the most difficult to burn of the batches of waste. If in fact the concentration of combustibles is lower, then the rate of oxygen supply may be reduced in accordance with the monitored concentration of at least one component of the flue gases or combustion products.

The oxygen supply rate is preferably determined in response to the concentration of carbon monoxide or in response to the ratio of the carbon monoxide concentration to the oxygen concentration. Preferably, the oxygen supply rate is controlled automatically. Preferably, the automatic control system includes detecting means for detecting a batch of waste material at an entrance to the main combustion region, a timer for setting the duration of each period of time of the first set, monitoring means for automatically monitoring in real time the concentration of at least one chosen component of the combustion products or flue gas, and at least one automatically-operable valve in a conduit or conduits for supplying oxygen to the secondary combustion region. In accordance with this aspect of the invention, the detection means is able to generate a signal which starts the first period and actuates the valve or valves, preferably solenoid-activated, to adjust the oxygen supply rate as necessary to a chosen value. The timer is able to generate a signal that ends the first period and starts a second period. The monitoring means is able to generate a signal which actuates the valve or valves as necessary to adjust the oxygen supply rate during the second period in response to the concentration of the chosen component or a function of such concentration.

Preferably, the first combustion region is defined in a chamber having an outer door and inner door for feeding batches of waste material into the main combustion region. The opening of the outer door actuates the detecting means to generate a signal. Alternatively, entry of a batch of material through the outer door may break a beam of electro-magnetic radiation and thereby enable a signal to be generated to start a first period of time.

The main and secondary combustion regions may be defined in the same or different chambers. The method and apparatus according to the present invention are particularly suitable for incinerators of a kind in which both regions are defined in the same chamber, such incinerators having in the past given rise to particular pollution problems.

Preferably, the apparatus according to the invention is able to change the oxygen supply rate only in increments. For example, the oxygen may be supplied through a plurality of automatically-operable on-off valves in parallel with one another, the arrangement being such that the oxygen flow rate is proportional to the number of valves that are open at any one time. The oxygen is preferably introduced with a swirling motion about an axis that extends in the general direction of flow of the combustion products through the secondary combustion region.

BRIEF DESCRIPTION OF THE DRAWINGS

The following drawings in which like reference characters indicate like parts are illustrative of embodiments of the invention are not intended to limit the invention as encompassed by the claims forming part of the application:

Referring to FIGS. 1 and 2 of the drawings, there is shown a boiler-cum-incinerator comprising a furnace 2 having a refractory lining 4. The top of the furnace 2 has an outlet 6 for flue gases which communicates with a three-pass heat exchanger 8 which functions as a boiler of water and provides a jacket for the furnace 2. As shown in FIG. 2, the heat exchanger 8 comprises down passes 10 and 12 and an up pass 14 for flue gases from the furnace 2. A multiplicity of boiler tubes 16 is located in each pass. In operation, the flue gases give up heat to the boiler tubes 16 and are thus effective to raise steam.

Figure 1:
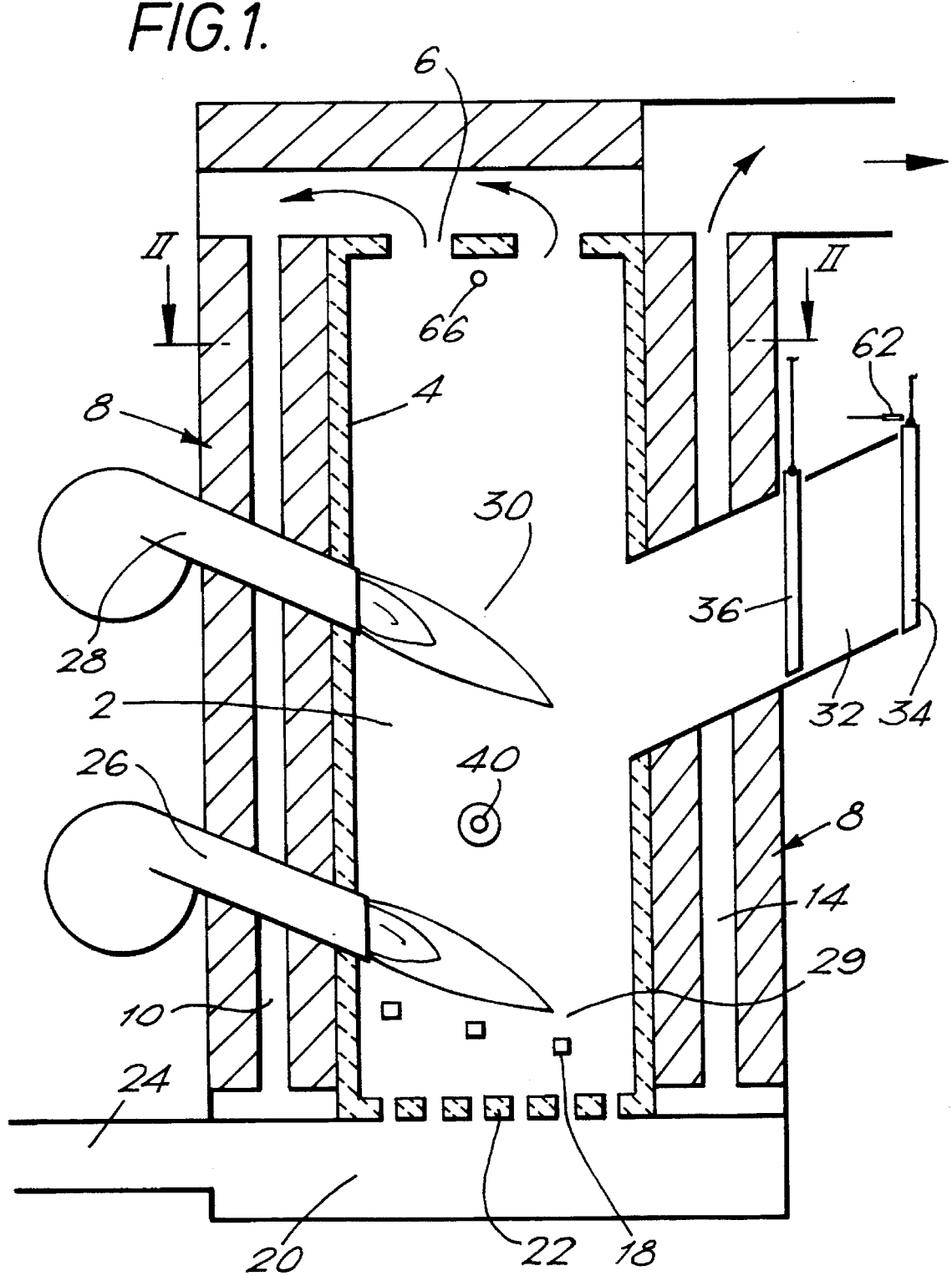
FIG. 1 is a schematic side elevational view, partly in section, of an incinerator in accordance with the present invention.

Near the bottom of the furnace 2 are located water cooled bars 18 which form a grate for supporting waste to be incinerated. The waste is typically supplied to the furnace 2 in plastic sacks (not shown). The waste for example, may be hospital wastes. The bars 18 are typically arranged so that as to form a sloping grate. The furnace 2 has a plenum chamber 20 at its bottom beneath a hearth 22 for a flow of air to support combustion of the sacks of waste. The chamber 22 has an inlet 24 communicating with a blower (not shown) or fan (not shown) for supplying an oxygen-containing gas such as combustion air.

The furnace 2 is illustrated with two burners 26 and 28. The burners 26, 28 preferably burn natural gas and may, for example, be of the kind sold under the trademark NUWAY. The lower burner 26 (as shown in FIG. 1) fires into a main combustion region 29 a little above the grate defined by the bars 18. The upper burner 28 fires into a secondary combustion region 30.

The furnace 2 has a chute 32 for feeding the waste containing plastic sacks to be incinerated into the main combustion region 29. The chute 32 has an outer door 34 and an inner door 36. The doors 34 and 36 may be of a guillotine type and their opening and closing may be actuated automatically.

In operation, the burners 26 and 28 may be lit and fired continuously. If desired, the upper burner 28 may alternate between high and low intensity firing modes, with means (not shown) for selecting the firing mode in response to the temperature of the flue gases. Thus, for example, the burner 28 may operate in a high intensity mode unless and until the sensed temperature of the flue gases at the outlet 6 exceeds, for example, about 1000° C.

Batches of hospital waste each contained in a plastic sack are admitted to the furnace at regular intervals, of for example every three minutes, via the chute 32. An oxygen containing gas such as air or air enriched in oxygen is supplied to the furnace 2 via the plenum chamber 20. The burner 26 raises the temperature in the main combustion region 29 for each sack fed from the chute 32 onto the grate defined by the bars 18 and its combustible content to initate combustion and thereby form combustion products. Given the nature of the plastic sack and typical hospital waste, the combustion products typically contain a sizeable proportion of combustible gases, as for example carbon monoxide and volatile organic compounds, as well as some particles of carbon. Such combustibles burn in the secondary combustion region 30 which is heated by the upper burner 28. The resulting flue gas flows out of the furnace 2 through the outlet 6, typically at a temperature on the order of about 850° C.

The flue gas then flows successively through the passes 10, 14 and 12 and to a stack (not shown) at a temperature near the prevailing ambient temperature. If necessary, a fan (not shown) may be operated to facilitate the flow of flue gas through the passes 10, 14 and 12 and into the stack. In flowing through the passes 10, 14 and 12 the flue gas gives up heat to the boiler tubes 16 and is thereby able to raise steam. In a typical commercial installation, such raising of steam is able to meet a sizeable portion of the demand for space heating in the hospital in which the illustrated incinerator is located.

It is often found that the composition of the flue gas is undesirable in that notwithstanding the provision of the secondary combustion region 30 it may still contain appreciable quantities of carbon monoxide or other poisonous gases or appreciable quantities of particles of carbon. In accordance with the present invention, commercially pure oxygen or oxygen-enriched air is introduced into the secondary combustion region 30 through at least one lance 40. The or each lance 40 is positioned above the burner lower 26 but below the upper burner 28 and extends into the second combustion region 30. Typically, just one lance 40 is used. The lance 40 preferably terminates in a 45° elbow directed towards the furnace wall so as to create a swirling flow about a vertical axis. The end of the lance 40 preferably points horizontally or at a small angle (e.g. 20°) upwardly. The swirling flow helps to increase the residence time of the gases in the secondary combustion region 30 and thus makes more time available for the oxidation of carbon monoxide, other combustible gases in the gaseous combustion products ascending from the main combustion region 29, and particles of carbon.

In practice, the composition of the combustion products can vary widely. Typical hospital practice is to employ black plastic sacks for normal office waste composed mainly of paper, yellow plastic sacks containing waste from wards, which will typically vary in make up from sack to sack but which typically contains a high proportion of plastics, and red sacks containing waste from operating theaters including dressings and organic and infectious tissue. The combustion properties of each kind of waste differ. If commercially pure oxygen is supplied to the secondary combustion region 30 at a rate such as to ensure complete combustion of all combustibles in the gaseous combustion products ascending from the main combustion region 29, even when the most difficult to burn waste is received (typically one having a high content of both water and plastics), then there will be a considerable over-supply of oxygen during periods in which readily combustible waste is burned (typically one with a high content of paper and a low content of water).

Figure 2:
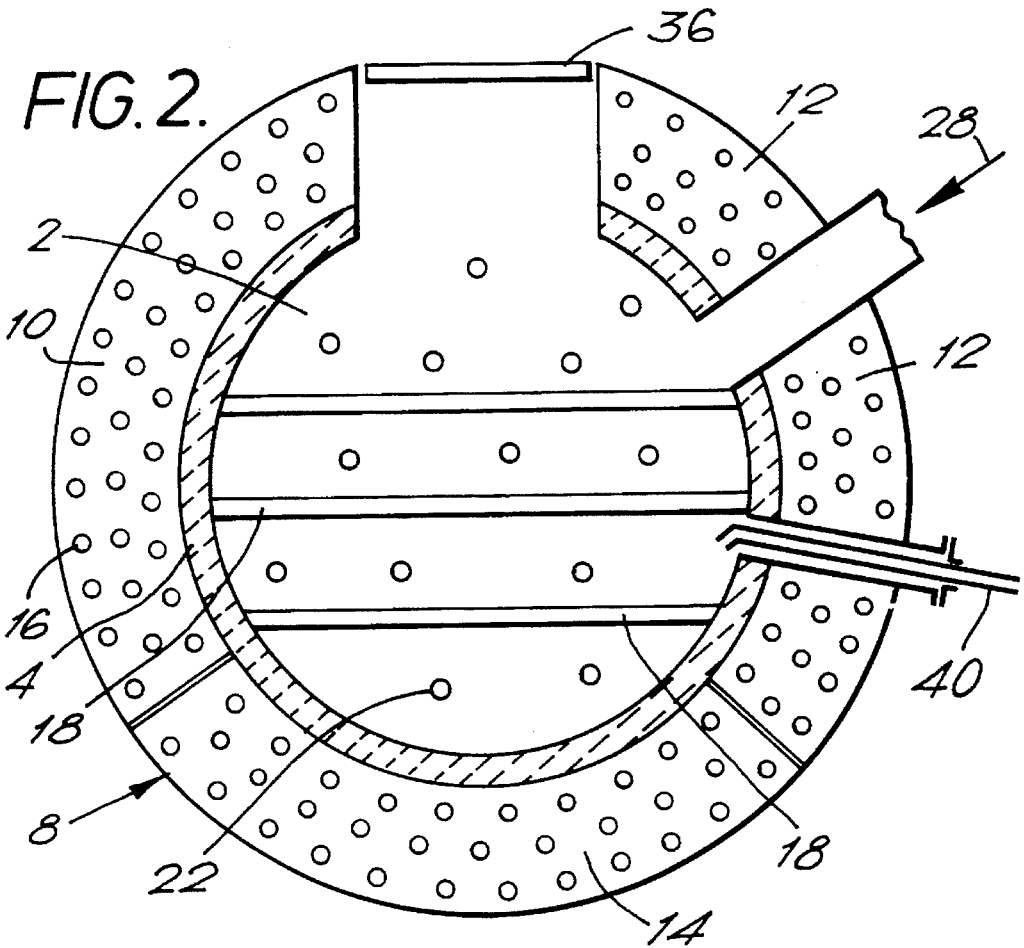
FIG. 2 is a cross-sectional view taken through the line II—II in FIG. 1.
Figure 3:
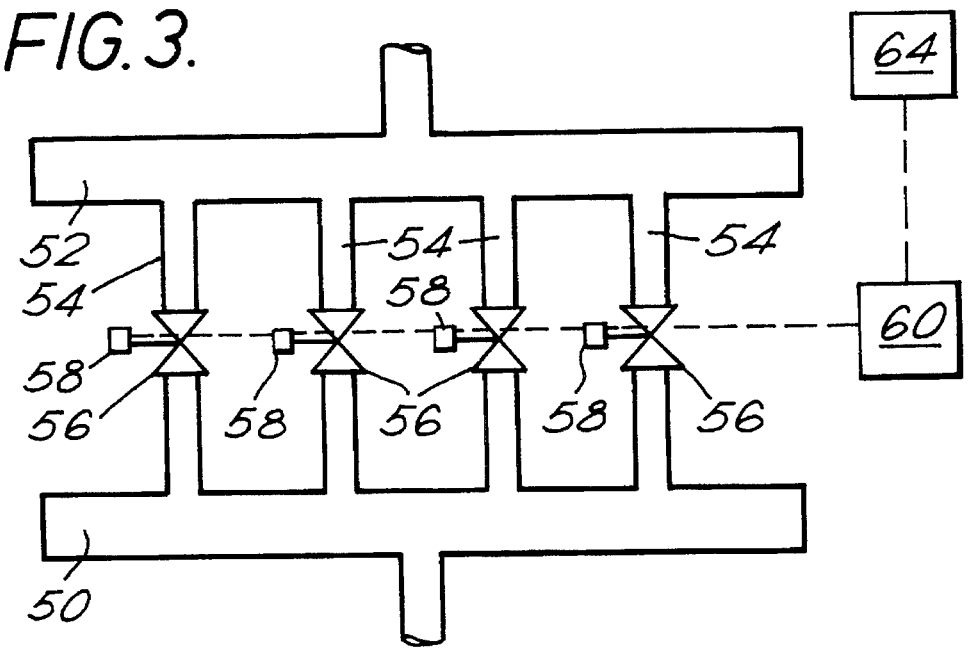
FIG. 3 is a schematic flow diagram illustrating an oxygen supply control apparatus for use in association with the incinerator shown in FIGS. 1 and 2.

In order to overcome this problem, it is desirable to employ the oxygen supply apparatus shown in FIG. 3. As shown in FIG. 3, the oxygen supply apparatus includes an upstream oxygen supply manifold 50 that communicates with a source (not shown) of, preferably, commercially pure oxygen, and a downstream oxygen supply manifold 52 communicating with the lance 40 (See FIGS. 1 and 2) that extends into the interior of the furnace 2. The respective manifolds 50 and 52 are inter-connected by and are able to be placed in communication with one another via four substantially identical conduits 54, each having an inlet end terminating in the manifold 50 and an outlet end terminating in the manifold 52. Each conduit 54 has its own solenoid actuated stop valve 56 located therein. Each stop valve 56 has but two positions; fully open, when there is a substantially unrestricted flow of oxygen therethrough; and fully closed, when flow of oxygen from the upstream manifold 50 to the downstream manifold 52 therethrough is prevented. Each valve 56 is preferably movable from its fully open position to its fully closed position substantially instantaneously, and back again substantially instantaneously.

Assuming a supply of oxygen at a constant pressure, the rate of flow of oxygen to the lance 40 (see FIG. 1 ) is thus proportional to the number of the valves 56 that are open at any one time and can be changed incrementally by changing the number of the valves 56 that are open.

Each of the valves 56 may be provided with a solenoid actuating mechanism 58 which is operatively associated with a programmable valve controller 60. The controller 60 is also operatively associated with a position sensor 62 (see also FIG. 1) which is actuated when the outer door 34 of the incinerator has been raised, typically a few centimeters, and a real time carbon monoxide analyzer 64 (See FIG. 2) which has a detector 66 positioned close to but upstream of the outlet 6 (see FIG. 1). The detector 66 is able to generate a signal proportional either to the concentration of carbon monoxide or to the ratio of the carbon monoxide concentration to the oxygen concentration in the flue gas at the region where it is positioned. The optimum position for the detector 66 is believed to be the closest to the main combustion region 29 at which the ram of reaction in the flue gases has subsided to a level at which meaningful gas concentration measurements can be taken. By a meaningful gas concentration measurement is meant a measurement of gas concentration from which the ultimate concentration of gas in the flue gases finally emitted from the incinerator can be assessed with reasonable accuracy. In general, the closer the detector 66 is to the main combustion region 29, the faster the response time of the oxygen supply apparatus to the receipt of an abnormal batch of waste material in the main combustion region 29.

The valve controller 60 may be programmed so as to ensure that the valves 56 may be operated in the following manner. First, when the outer door 34 starts to open a signal is generated by the sensor 62 and the controller sends a signal to the valves 56 to open a sufficient number of the valves such as three of the four illustrated in FIG. 3. The opening of the doors 34 and 36 is controlled automatically such that the outer door 34 opens at intervals of, typically, three minutes, with about 10 seconds for the door to travel from its closed to its fully opened position and back again.

Upon opening of the door 34, a plastic sack of waste material is then fed into the chute 32. The door 34 then closes. Once the door 34 has reached its fully closed position the inner door 36 begins to open. The inner door 36 reaches its fully open position and the sack falls under gravity into the main combustion region 29 and starts to burn and/or pyrolyse. The inner door 36 then starts to close again. The valve controller 60 has a timer circuit (not shown) which is actuated by the signal from the position sensor 62. It generates a signal upon the expiration of, for example, 25 seconds from the generation of the signal by the position sensor 62. During this period of 25 seconds, oxygen is supplied the secondary combustion region 30 at a relatively high flow rate since three of the four valves 56 are open. Thus, a relatively high concentration of oxygen is built up in the secondary combustion region 30 in advance of a sack containing combustible waste being received by the main combustion region 29.

The dimensions of the conduits 54 and the manifolds 50 and 52, and the oxygen supply pressure are chosen such that the level of oxygen will typically be sufficient to cope with the combustion products emanating from the kind of waste that is the most difficult to burn.

Once the timer generates its 25 second signal, the programmable controller 60 switches on control circuits that are responsive to signals from the carbon monoxide analyzer 64. The oxygen supply control thus becomes reactive to the level of carbon monoxide in the flue gas.

The controller 60 may be programmed such that when it is in a mode responsive to the analyzer 64, it will open and close valves according to the sensed carbon monoxide level. For example, if the sensed carbon monoxide level is less than about 100 parts per million by volume, all of the valves 56 are in their closed positions. If the carbon monoxide level reaches about 100 parts per million by volume, one of the valves 56 is opened; if the sensed carbon monoxide level reaches about 500 parts per million by volume, then a second valve 56 is opened. Should the carbon monoxide level reach about 1000 parts per million by volume, a third valve 56 is opened, and should the sensed carbon monoxide level reach about 1500 parts per million by volume the fourth valve 56 is opened.

In normal operation, many of the plastic sacks and their contents will be relatively easy to burn. In this circumstance, (a) the controller 60 becomes immediately responsive to the analyzer 64, (b) the carbon monoxide concentration is less than 2% by volume and (c) one or more of the valves 56 are closed according to the precise level of carbon monoxide sensed by the analyzer. Thus, the oxygen supply rate to the lance 40 is reduced. On the other hand, if any particular sack is difficult to burn such that the combustion products from the main combustion region 29 are relatively rich in carbon monoxide, the oxygen concentration in the secondary combustion region 30 will normally be sufficient to prevent significant quantities of carbon monoxide remaining unreacted and entering the flue gas. Accordingly, the apparatus shown in FIG. 3 is able to keep oxygen consumption at a low level while enabling incineration to be performed without producing an unacceptable quality of flue gas for a prolonged period of time.

The ability of a supply of oxygen through the lance 40 to decrease the concentration of carbon monoxide in the flue gas is illustrated in Table I.

TABLE I

| Test | Type of Bag Burned* | No Bags Burned in Series | Oxygen Supply | | | | | Flue gas composition Base Line | | Time CO | Average CO peak duration above |
| | | | Underhearth | | Overhearth through Lance 40 | | Oxygen Lance 40 angle | Mean CO ppm | Mean O2 % | 150 ppm % | 150 ppm secs |
| | | | SCFH | Time | SCFH | Time | | | | | |
| *A | Y | 26 | — | — | — | — | 113 | 8.0 | 42 | 173 | |
| *B | B | 22 | — | — | — | — | 129 | 10.0 | 39 | 117 | |
| *C | B | 8 | 100 | Continuous | 1700 | 120 | Horizontal | 26 | 13.5 | 0 | 0 |
| *D | M | 28 | 100 | Continuous | 3000 | 120 | 45° upwards | 30 | 12.0 | 16 | 72 |

*Y = Yellow
*B = Black
*M = Mixed

Each time the outer door is opened, the valve controller 60 receives a signal from the position sensor 62, it reverts to a mode of operation independent of the carbon monoxide analyzer 64, with three of the four valves 56 open.

EXAMPLE

Experiments that have been conducted on a CORSAIR incinerator of the kind shown in FIGS. 1 and 2 having a single chamber whose internal diameter was approximately 1 meter and whose height was approximately 2.5 meters. The burners 26 and 28 were NUWAY natural gas burners. The total rate of natural gas consumption was 1563 standard cubic feet per hour. Air was supplied to the plenum chamber 20 at a rate of 770 standard cubic feet per hour. Commercially pure oxygen was mixed at a rate of 100 standard cubic feet per hour with the air supplied to the plenum chamber 20. Plastic sacks containing hospital waste of varying composition were fed to the incinerator at the rate of one sack every three minutes. Commercially pure oxygen was supplied at a basic rate of 3400 standard cubic feet per hour to the lance 40 (which was disposed facing upwards at an angle of 45° to the horizontal) during a first time period. The first time period extending for about 30 seconds before a bag enters the combustion region 29 to 30 seconds after the entry of the bag into the combustion region 29. Thereafter, the oxygen supply rate was controlled by means of signals representative of the carbon monoxide concentration generated by the detector 66. In this manner, it is possible to eliminate or minimize the number of times the carbon monoxide concentration in the flue gases leaving the incinerator exceed 150 parts per million by volume. In the absence of a supply of commercially pure oxygen, the carbon monoxide concentration regularly exceeded 1000 parts per million by volume.

A further advantage arising from the use of oxygen in accordance with the invention is that failure to burn some parts of the plastic sacks is avoided and therefore there is no accumulation of unburnt plastics material on the hearth 22. Moreover, there is a reduction in the amount of ash accumulated when the air supplied to the plenum chamber 20 is enriched in oxygen.

The tests summarized in Table I were performed on bags of hospital waste. In Test A, yellow bags containing waste from hospital wards were incinerated. 26 such bags were incinerated over a period of 70 minutes, the bags being fed to an incinerator of the kind shown in FIGS. 1 and 2 at the rate of one about every 3 minutes. During Test A, no oxygen was introduced into the incinerator through the lance 40, and no oxygen was added to the air flowing into the incinerator from under the hearth.

In Test B, 22 black bags containing normal office waste (mainly paper) were fed one at a time into the incinerator. The experimental procedure adopted was the same as for Test A.

In Test C, 8 black bags containing normal office waste (mainly paper) were burned. The bags were fed to the incinerator at intervals of three minutes. The air flow into the hearth of the incinerator was enriched in oxygen so as to increase its oxygen concentration to approximately 30 per cent by volume. Such oxygen enrichment appeared to increase hearth temperature and improve the combustion of carbonaceous material in the waste thus reducing the volume of ash. Oxygen was injected into the incinerator through the lance 40 which was positioned with its outlet horizontal. Oxygen was not introduced continuously through the lance 40. Rather, it was supplied for approximately the first 120 seconds of each 180 second time period between successive bags being received on the incinerator grate.

The results show that the carbon monoxide concentration in the flue gas was decreased in comparison to Test B.

Test D was conducted in a manner similar to that of Test C. The test was performed on a mixture of bags of different rinds of waste that can arise in a hospital. Since some of these bags contained "difficult to burn" waste, a higher rate of introduction of oxygen into the incinerator through the lance 40 was chosen. In addition, the lance 40 was disposed with its outlet facing upwards at an angle of 45° to the horizontal. The results show that there was a decrease in the carbon monoxide concentration in the flue gas in comparison to the results of Test A. However, carbon monoxide peaks above 150 ppm in the flue gas were not entirely eliminated. This result is attributed to the fact that the start of each 120 second pulse of oxygen from the lance 40 tended to lag behind the receipt on the incinerator grate of a respective bag of waste to be incinerated. Since carbon monoxide evolution was extremely rapid once a bag was received on the incinerator grate there was a tendency for some carbon monoxide to "miss" the oxygen injected through the lance 40. This problem can be ameliorated by operating the incinerator in accordance with the invention with the receipt of each bag on the incinerator grate lagging behind commencement of a respective pulse of oxygen through the lance 40.

What is claimed is:

1. A method for incinerating waste material comprising feeding to the main combustion region batches of combustible waste material with varying califoric value, burning said batches of waste material in said main combustion region and thereby forming products containing combustibles, transferring said combustibles to a secondary combustion region, supplying to said secondary combustion region an oxygen-enriched gas for a first period of time comprising the time immediately before the batches of waste material are fed to the main combustion region at a first rate to react with said combustibles to form combustion products, flue gas or a combination thereof, said first rate being independent of the composition of the combustion products or flue gas, supplying the oxygen-enriched gas to the secondary combustion region for a second period of time, alternating with said first period of time, at a second rate, and monitoring the concentration of at least one component of the combustion products or flue gas, said second rate of supplying said oxygen-enriched gas being determined as a function of the monitored concentration of said at least one component of said combustion products or flue gas.

2. The method of claim 1 wherein the oxygen-enriched gas is oxygen gas.

3. The method of claim 1 in which said component is carbon monoxide.

4. The method of claim 1 comprising supplying said oxygen-enriched gas into the secondary combustion region with a swirling motion about an axis that extends in the general direction of the flow of the combustion products.

5. The method of claim 1 further comprising detecting the presence of a batch of waste material at an entrance of the main combustion region, generating a signal which starts said first period of time, supplying said oxygen-enriched gas during said first period of time at a chosen rate, generating a signal that ends the first period of time and starts said second period of time, detecting the concentration of a chosen component of the combustion products or the flue gas, generating a signal which actuates a change in the rate of the oxygen-enriched gas in the second period of time in response to the concentration of said component.

6. The method of claim 1 further wherein said alternating first and second periods of time occur at least twice.

\* \* \* \* \*